US007663645B1

(12) United States Patent
Okamoto

(10) Patent No.: US 7,663,645 B1
(45) Date of Patent: Feb. 16, 2010

(54) IMAGE DISPLAY DEVICE

(76) Inventor: Masao Okamoto, 1905 Oxley St., South Pasadena, CA (US) 91030

( * ) Notice: Subject to any disclaimer, the term of this patent is extended or adjusted under 35 U.S.C. 154(b) by 352 days.

(21) Appl. No.: 11/676,795

(22) Filed: Feb. 20, 2007

(51) Int. Cl.
G09G 5/00 (2006.01)
(52) U.S. Cl. .............. 345/619; 348/14.08; 382/103
(58) Field of Classification Search ......... 345/619; 348/14.08; 382/103
See application file for complete search history.

(56) References Cited

U.S. PATENT DOCUMENTS

| D312,829 | S | 12/1990 | Kuroki |
| 5,486,485 | A | 1/1996 | Kim et al. |
| 5,532,741 | A | 7/1996 | Tsutsumi |
| 5,937,213 | A * | 8/1999 | Wakabayashi et al. ........ 396/50 |
| 6,651,943 | B2 | 11/2003 | Cho et al. |
| 7,054,668 | B2 | 5/2006 | Endo et al. |
| 7,206,006 | B2 * | 4/2007 | Nah et al. ................... 345/698 |
| 7,388,981 | B2 * | 6/2008 | Jouppi ........................ 382/103 |
| 2002/0008676 | A1 * | 1/2002 | Miyazaki et al. ............... 345/6 |
| 2002/0118861 | A1 * | 8/2002 | Jouppi et al. ............... 382/103 |

2006/0033867 A1 2/2006 Krisko et al.

OTHER PUBLICATIONS

Jeff Sauer, "LifeSize Team HD", Feb. 1, 2007, svconline.com.*
Joseph, B. and Gara, A., "Respnse time of a liquid crystal image transducer", General Motors Research Laboratories, Jul. 1, 1978, p. 1-3.*

* cited by examiner

Primary Examiner—M Good Johnson
(74) Attorney, Agent, or Firm—Advantia Law Group; Michael W. Starkweather

(57) ABSTRACT

An image display device for providing an image to an observer; the invention comprises: a display module configured to display an image and an image transducer module. The image transducer module includes a visual information receiver module coupled to the display module to receive visual information. A control module in communication with the visual information receiver module and with the display module configured to deliver visual information to the display module for display; wherein the display module displays a non-mirror image of the analog visual information. A mounting device coupled to a back of the display module and configured to mount the display module to a surface. Wherein the control module includes an image modification module configured to enable a user to selectively modify a displayed image. Wherein the display module includes a LCD display sized to provide a life-sized full body image of an average person.

6 Claims, 3 Drawing Sheets

IMAGE DISPLAY DEVICE

BACKGROUND OF THE INVENTION

1. Field of the Invention

The present invention relates to image display devices, specifically an image display device for providing an image to an observer.

2. Description of the Related Art

Mirrors have been used for centuries to check the reflection or image of an object or a person. However, mirrors reflect the exact image back to the person or object in front of the mirror. Inventions have been made to have a display device that could display a true realistic image of an object or person, not just a reflective image. Cameras can display images on to a television when the subject is placed in front of the camera and the camera is in communication with the television set. Such cameras have been referred to as a liquid crystal monitor movie.

Some improvements have been made in the field. Examples include but are not limited to the references described below, which references are incorporated by reference herein:

U.S. Pat. No. 5,486,485, issued to Kim et al., discloses a method that is set forth for forming a plurality of SOI transistors in a pattern beneath planarized reflective surfaces of a reflective display. This enables the formation of information pixels useful in devices, such as reflective LCD devices. A specific technique of providing the SOI transistors is set forth.

U.S. Pat. No. 5,532,741, issued to Tsutsumi, discloses a serial pattern generator circuit for serially outputting a bit pattern corresponding to one line received in parallel from a character generator and, in response to a predetermined control signal, generating the serial bit pattern with an inverted bit sequence is disclosed. A combining circuit is provided for combining an output of the serial pattern generator circuit with a video signal of a displayed video image. A mirror image signal generator circuit responsive to an output signal of the combining circuit and the control signal is provided in order to generate a mirror image signal.

U.S. Pat. No. 6,651,943, issued to Cho et al., discloses a stand fixing structure of a LCD monitor. The stand structure of the LCD monitor according to the present invention includes a rear cover, a VESA cover engaged to a back surface of the rear cover, a rotation plate rotatably engaged at a bottom of a circular groove grooved on a back surface of the VESA cover and having a certain diameter, a rotatable stand having both ends hinged to the rotation plate, and a pair of opposite hooks protruded from both corner portions of a back surface of the VESA cover, whereby the stand is rotated and fixed at the hooks, and when the LCD monitor is hanged on a wall, the stand is supported by the hooks for thereby preventing the LCD monitor from being inclined in a certain direction.

U.S. Pat. No. 7,054,668, issued to Endo et al., discloses a makeup mirror apparatus comprising a case body, a case lid, and a rotary shaft rotatably connecting the case body and the case lid. The case body is provided with a cosmetic-material containing area, a brush containing area, and operation buttons. The case lid is provided with a mirror unit, a camera portion, and a memory slot. The mirror unit is constituted such that an LCD panel is stacked on a half mirror. By manipulating the operation button, a sample image is read from a memory card loaded in the memory slot. The read sample image is displayed on the LCD panel and is overlapped with a user's face reflected in the half mirror. Makeup is performed by tracing the sample image.

U.S. Patent Application Publication No.: 2006/0033867, by Krisko; Annette J.; et al., discloses embodiments of the invention that include a LCD having a mirror including a substrate having a first surface and a second surface. The substrate may carry one or more dichroic mirror coatings and the LCD or mirror may be selectively viewable from the first surface side. Embodiments of the invention also include methods of making and using a LCD mirror.

U.S. Design Pat. No.: 312,829, issued to Kuroki, discloses an ornamental design for a combination camera and mirror.

The inventions heretofore known suffer from a number of disadvantages which include being difficult to use, non-durable, non-practical, and expensive.

What is needed is an image display device that solves one or more of the problems described herein and/or one or more problems that may come to the attention of one skilled in the art upon becoming familiar with this specification.

SUMMARY OF THE INVENTION

The present invention has been developed in response to the present state of the art, and in particular, in response to the problems and needs in the art that have not yet been fully solved by currently available image display device. Accordingly, the present invention has been developed to provide a realistic full body image of a person.

There is one embodiment of an image display device, for providing an image to an observer that may comprise: a display module that may be configured to display an image associated with image data; an image transducer module that may be configured to convert analog visual information to image data. In addition, the image transducer module may include: a visual information receiver module that may be coupled to the display module and may be positioned and oriented to receive visual information from directly in front of the display module; and a control module that may be in communication with the visual information receiver module and with the display module and may be configured to deliver visual information to the display module for display thereon. The display module may display a non-mirror image of the analog visual information. A mounting device may be coupled to a back of the display module and may be configured to mount the display module to a surface.

According to another embodiment of the image display device, wherein the control module may include an image modification module that may be configured to enable a user to selectively modify a displayed image.

In still another embodiment of the image display device, wherein the display module may include a LCD display sized to provide a life-sized full body image of an average person.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussion of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize that the invention can be practiced without one or more of the specific features or advantages of a particular embodiment. In other instances, additional features and advantages may be recognized in certain embodiments that may not be present in all embodiments of the invention.

These features and advantages of the present invention will become more fully apparent from the following description and appended claims, or may be learned by the practice of the invention as set forth hereinafter.

BRIEF DESCRIPTION OF THE DRAWINGS

In order for the advantages of the invention to be readily understood, a more particular description of the invention briefly described above will be rendered by reference to specific embodiments that are illustrated in the appended drawing(s). Understanding that these drawing(s) depict only typical embodiments of the invention and are not therefore to be considered to be limiting of its scope, the invention will be described and explained with additional specificity and detail through the use of the accompanying drawing(s), in which.

DETAILED DESCRIPTION OF THE INVENTION

Figure 1:
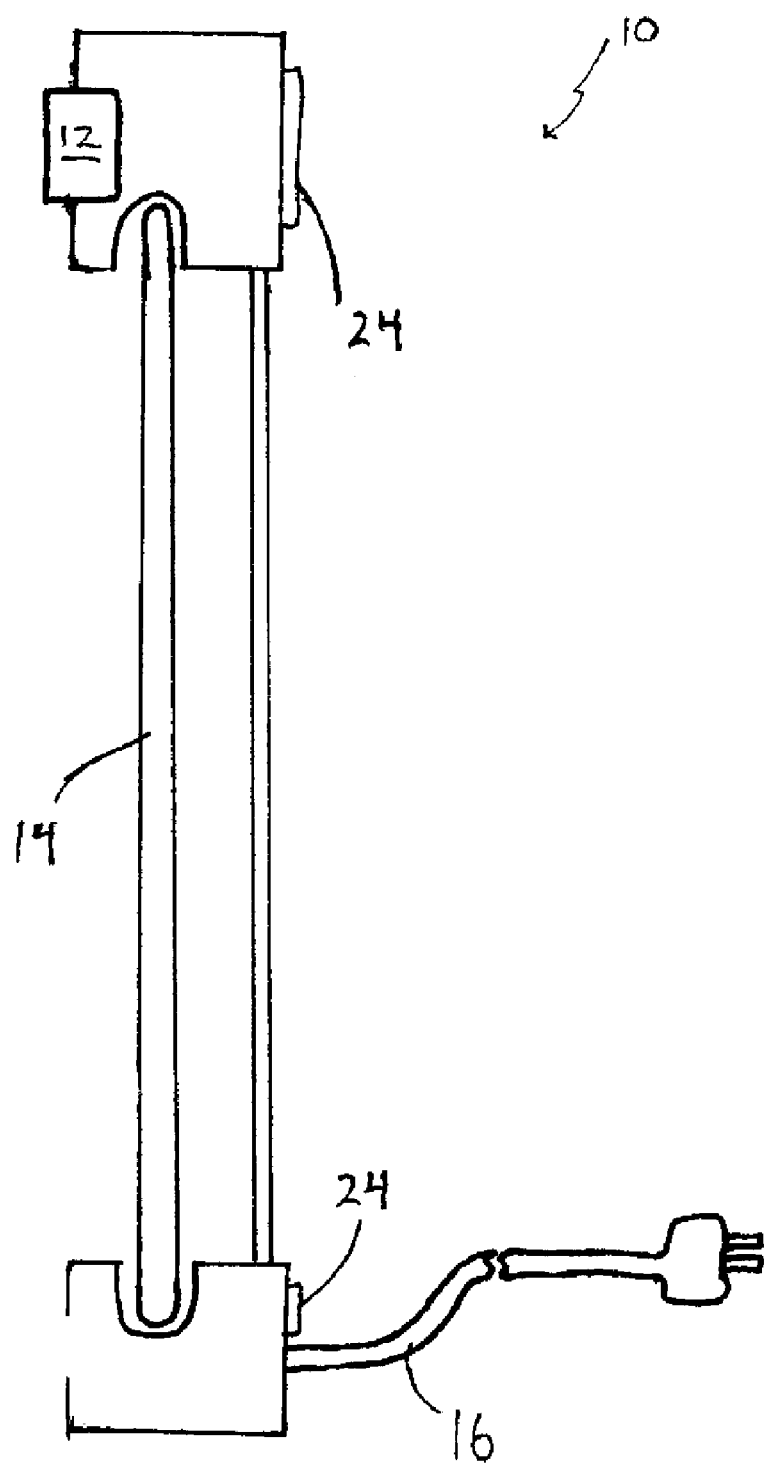
FIG. 1 illustrates a front perspective view of an image display device, according to one embodiment of the invention.
Figure 2:
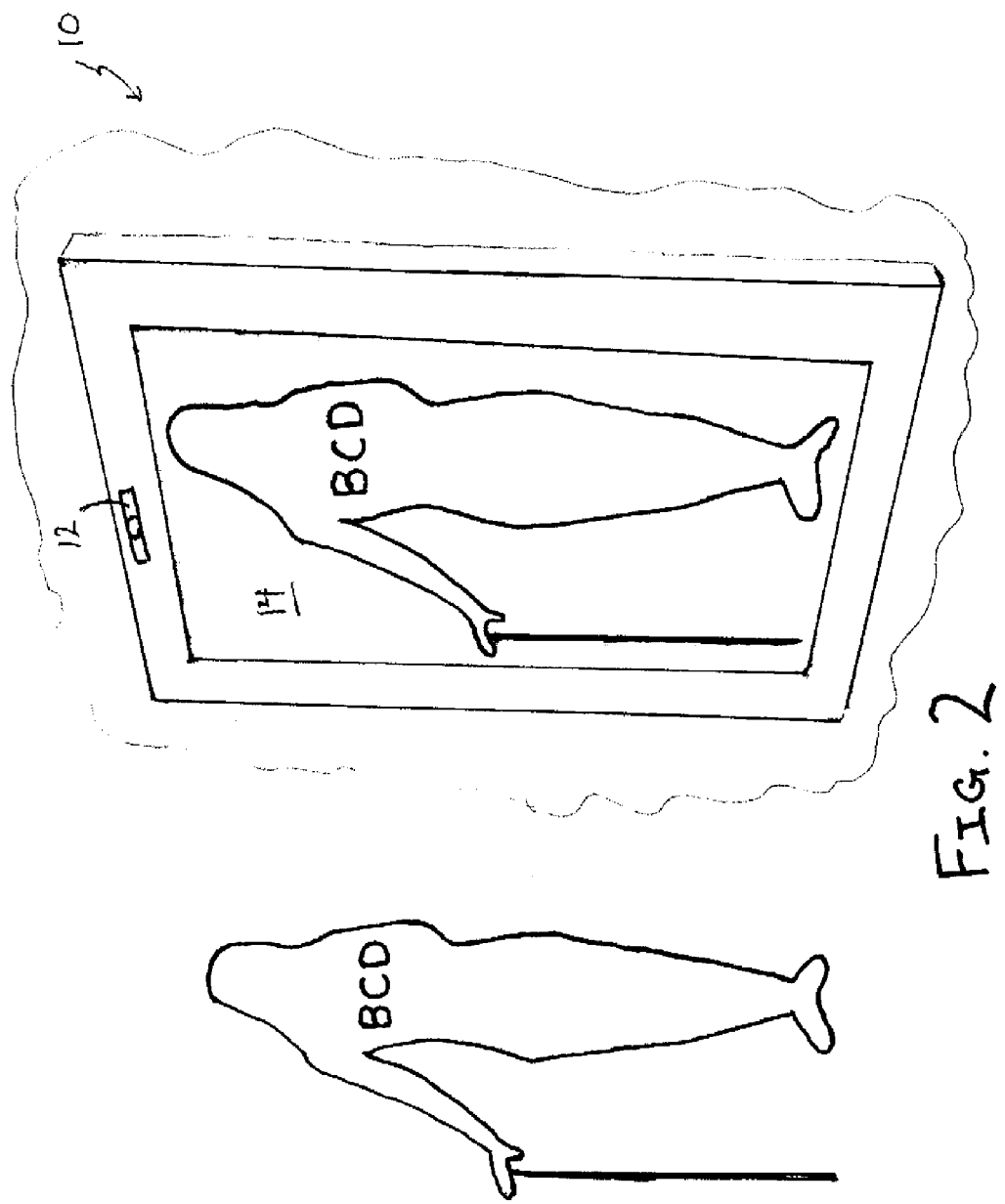
FIG. 2 illustrates a side elevational view of an image display device, according to one embodiment of the invention.
Figure 3:
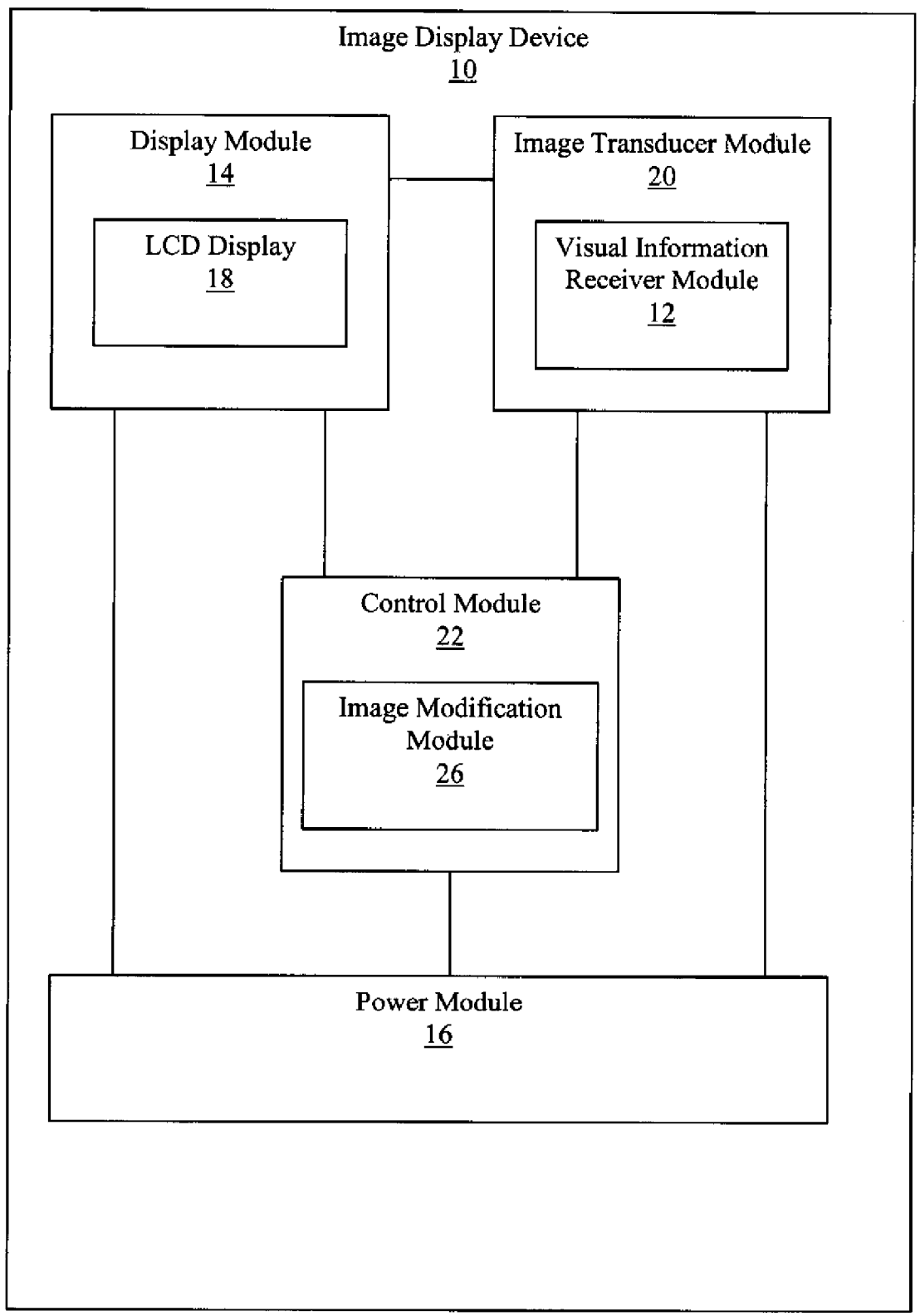
FIG. 3 illustrates a block diagram of an image display device, according to one embodiment of the invention.

For the purposes of promoting an understanding of the principles of the invention, reference will now be made to the exemplary embodiments illustrated in the drawing(s), and specific language will be used to describe the same. It will nevertheless be understood that no limitation of the scope of the invention is thereby intended. Any alterations and further modifications of the inventive features illustrated herein, and any additional applications of the principles of the invention as illustrated herein, which would occur to one skilled in the relevant art and having possession of this disclosure, are to be considered within the scope of the invention.

Reference throughout this specification to "one embodiment," "an embodiment," or similar language means that a particular feature, structure, or characteristic described in connection with the embodiment is included in at least one embodiment of the present invention. Thus, appearances of the phrases "one embodiment," "an embodiment," and similar language throughout this specification may, but do not necessarily, all refer to the same embodiment, different embodiments, or component parts of the same or different illustrated invention. Additionally, reference to the wording "an embodiment," or the like, for two or more features, elements, etc. does not mean that the features are related, dissimilar, the same, etc. The use of the term "an embodiment," or similar wording, is merely a convenient phrase to indicate optional features, which may or may not be part of the invention as claimed.

Each statement of an embodiment is to be considered independent of any other statement of an embodiment despite any use of similar or identical language characterizing each embodiment. Therefore, where one embodiment is identified as "another embodiment," the identified embodiment is independent of any other embodiments characterized by the language "another embodiment." The independent embodiments are considered to be able to be combined in whole or in part one with another as the claims and/or art may direct, either directly or indirectly, implicitly or explicitly.

Finally, the fact that the wording "an embodiment," or the like, does not appear at the beginning of every sentence in the specification, such as is the practice of some practitioners, is merely a convenience for the reader's clarity. However, it is the intention of this application to incorporate by reference the phrasing "an embodiment," and the like, at the beginning of every sentence herein where logically possible and appropriate.

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, comprise one or more physical or logical blocks of computer instructions which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of executable code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network.

As used herein, "comprising," "including," "containing," "is, are," "characterized by," and grammatical equivalents thereof are inclusive or open-ended terms that do not exclude additional unrecited elements or method steps. "Comprising" is to be interpreted as including the more restrictive terms "consisting of" and "consisting essentially of."

FIG. 1 illustrates one embodiment of an image display device 10, for providing an image to an observer. The image display device 10 comprises: a display module 14, such as a mirror that is configured to display an image associated with image data in the form of a person, object, etc. for example; an image transducer module 20 that is configured to convert analog visual information to image data. A non-limiting example of a display module is a standard LCD Display Module manufactured by Liquid Crystal Images, Inc. 17078 Munn Road, Chagrin Falls, Ohio, 44023. In addition, the image transducer module 20 includes: a visual information receiver module 12, such as a digital camera, that is coupled to the display module 14 and is positioned and oriented to receive visual information from directly in front of the display module 14; and a control module 22 that is in communication with the visual information receiver module 12 and with the display module 14 and is configured to deliver visual information to the display module 14 for display thereon. A non-limiting example of a visual information receiver module is described in a U.S. Pat. No. 5,532,741 issued to Tsutsumi which is incorporated by reference herein. The display module 14 displays a non-mirror image of the analog visual information. A mounting device 24 is coupled to a back of the display module 14 and is configured to mount the display module 14 to a surface. A non-limiting example of a mounting device is described in a U.S. Pat. No. 5,762,436 issued to Mosdal which is incorporated by reference herein.

According to another embodiment of the image display device, wherein the control module 22 includes an image modification module 26 configured to enable a user to selectively modify a displayed image. A non-limiting example of an image modification module 26 is described in a U.S. Pat. No. 6,344,907 issued to Watanabe, et al. which is incorporated by reference herein.

In still another embodiment of the image display device, wherein the display module 14 may include a LCD 18 display sized to provide a life-sized full body image of an average person.

It is understood that the above-described embodiments are only illustrative of the application of the principles of the present invention. The present invention may be embodied in other specific forms without departing from its spirit or essential characteristics. The described embodiment is to be considered in all respects only as illustrative and not restrictive. The scope of the invention is, therefore, indicated by the appended claims rather than by the foregoing description. All changes which come within the meaning and range of equivalency of the claims are to be embraced within their scope.

In operation of the illustrated embodiments, a user may stand directly in front of the image display device 10; and take a digital image of themselves with the visual information receiver module 12. Thereby displacing an image onto the display module 14, allowing the user to view the image. In addition, the user may manipulate the image modification module 26 to adjust the image, such as but not limited to the color, contrast, tint, resolution, and picture quality. The image display device 10 can be mounted onto any surface by utilizing the mounting device 24, and the power module 16 can be inserted into any standard socket plug to obtain power to the image display device 10.

It is also envisioned that the visual information receiver module 12, display module 14, image transducer 20, control module 22, mounting device 24, image modification module 26 may be disposed anywhere on the image display device 10, wherein the invention functions according to its intended purpose.

It is expected that there could be numerous variations of the design of this invention. An example is that the display frame, visual information receiver module 12, display module 14, power module 16, LCD screen 18, image transducer 20, control module 22, image modification module 26, and mounting device 24 may vary in length, width, dimension, diameter, design, color, shape, and brand according to various embodiments of the invention.

Finally, it is envisioned that the components of the device may be constructed of a variety of materials, such as wood, metal, metal alloys, plastic, etc. . . .

Thus, while the present invention has been fully described above with particularity and detail in connection with what is presently deemed to be the most practical and preferred embodiment of the invention, it will be apparent to those of ordinary skill in the art that numerous modifications, including, but not limited to, variations in size, materials, shape, form, function and manner of operation, assembly and use may be made, without departing from the principles and concepts of the invention as set forth in the claims.

What is claimed is:

1. An image display device for providing an image to an observer, comprising:
   a) a display module configured to display an image associated with image data;
   b) an image transducer module configured to convert analog visual information to image data, the image transducer module including:
      b1) a visual information receiver module coupled to the display module and positioned and oriented to receive visual information from directly in front of the display module; and
      b2) a control module in communication with the visual information receiver module and with the display module and configured to deliver visual information to the display module for display thereon, wherein the display module displays a non-mirror image of the analog visual information;
   c) a mounting device coupled to a back of the display module and configured to mount the display module to a surface.

2. The image display device of claim 1, wherein the control module includes a image modification module configured to enable a user to selectively modify a displayed image.

3. The image display device of claim 1, wherein the display module includes a LCD display sized to provide a life-sized full body image of an average person.

4. An image display device for providing an image to an observer, consisting essentially of:
   a) a display module configured to display an image associated with image data;
   b) an image transducer module configured to convert analog visual information to image data, the image transducer module including:
      b1) a visual information receiver module coupled to the display module and positioned and oriented to receive visual information from directly in front of the display module; and
      b2) a control module in communication with the visual information receiver module and with the display module and configured to deliver visual information to the display module for display thereon, wherein the display module displays a non-mirror image of the analog visual information;
   c) a mounting device coupled to a back of the display module and configured to mount the display module to a surface.

5. The image display device of claim 4, wherein the control module includes a image modification module configured to enable a user to selectively modify a displayed image.

6. The image display device of claim 4, wherein the display module includes a LCD display sized to provide a life-sized full body image of an average person.

\* \* \* \* \*